Aug. 16, 1966   K. W. JONES   3,266,388
STRIPPING MECHANISM
Filed Dec. 30, 1963   2 Sheets-Sheet 1

INVENTOR.
KENNETH W. JONES,
BY
ATTORNEYS.

Aug. 16, 1966 K. W. JONES 3,266,388

STRIPPING MECHANISM

Filed Dec. 30, 1963

INVENTOR.
KENNETH W. JONES,

BY

ATTORNEYS.

United States Patent Office
3,266,388
Patented August 16, 1966

3,266,388
STRIPPING MECHANISM
Kenneth W. Jones, 1713 Jackson Lane, Franklin, Ohio
Filed Dec. 30, 1963, Ser. No. 334,521
7 Claims. (Cl. 93—36)

This invention relates to machinery for use in the manufacture of paperboard structures, such as bottle carriers, folding cartons and the like formed from cut and scored paperboard blanks, and has to do more particularly with the provision of stripping mechanism for removing scrap areas from the cut and scored paperboard blanks.

By way of a nonlimiting example, in the manufacture of paperboard bottle carriers, the paperboard stock in either blank or web form is fed into a cutting and scoring press wherein the stock is cut and scored to define the various parts of the carrier structure, such as the side and end walls, the internal partitions, and the handle forming portions, together with the various attachment flaps and the like by means of which the parts are secured together to define the assembled carrier. The layout of the carrier blank results in scrap areas which must be removed prior to the fabrication of the blanks into completed carriers. Originally, these scrap areas were removed by hand, being knocked out of the blank subsequent to the cutting and scoring operation, but with the advent of high speed manufacturing equipment, the industry turned toward mechanical devices for removing the scrap. While such mechanical stripping devices have taken numerous forms, the most widely employed type comprises a series of spike-like pins arranged to rotate below the surface of the cut and scored blank, the timing of the parts being such that the spikes will puncture the blank in the areas to be scrapped, whereupon the spikes pull the scrap downwardly so as to break it away from the remainder of the blank. Comb-like elements are arranged to strip the scrap from the stripper pins. While such devices have been in widespread usage, they have left much to be desired insofar as their all-over efficiency is concerned, particularly where the stripping mechanism must operate at relatively high speeds. The stripping action is essentially a push-pull movement in that the scrap is pushed upwardly as it is punctured by the pins, and then it must be pulled downwardly as it is broken away from the remainder of the blank. The pins are discontinuous about the rotating member on which they are mounted, and their orientation so as to contact only those portions of the blank to be removed is a tedious task requiring precise timing of the moving parts.

In contrast to the foregoing, the instant invention contemplates a stripping mechanism wherein the parts of the blank to be removed are contacted from above by means of a timing wheel mounting easily adjustable legs which contact the areas of the blank to be removed and deflect them downwardly for removal. Thus, instead of the push-pull movement characteristic of prior art stripping devices, the instant invention contemplates a unidirectional stripping movement in which lug means act to deflect the scrap downwardly from the plane of the blank.

In accordance with the objectives of the invention, the downward deflection of the scrape areas of the blank is enforced by coacting stripping means underlying the path of travel of the blanks. In a preferred embodiment of the invention such coacting stripping means comprises a rotating disk provided about its periphery with a continuous series of teeth. Thus, as the scrap areas are deflected downwardly by the timing lugs—which in this instance comprise a spaced apart pair of lug members adapted to receive the toothed disk therebetween—the lugs cause the scrap to be impaled on the teeth and hence positively carried downwardly away from the blank.

In another embodiment of the invention, a spaced apart pair of coacting lug members acts to break the scrap section over a rotating disk having a smooth peripheral edge which coacts with the lugs to enforce the breaking away of the scrap section from the remainder of the blank. In still other embodiments of the invention, the lugs may take the form of one or more resilient tips arranged to coact with annular bands of resilient material forming a part of the underlying stripping member. As will be pointed out hereinafter, one or more or even all of the various embodiments of the invention may be utilized in a given scrap stripping unit, depending upon the size and shape of the scrap areas to be removed.

The foregoing, together with other objectives of the invention which will appear hereinafter or which will be apparent to the skilled worker in the art upon reading this specification, I accomplish by those constructions and arrangements of parts of which I shall now describe certain exemplary embodiments.

Reference is now made to the accompanying drawings wherein.

Figure 1:
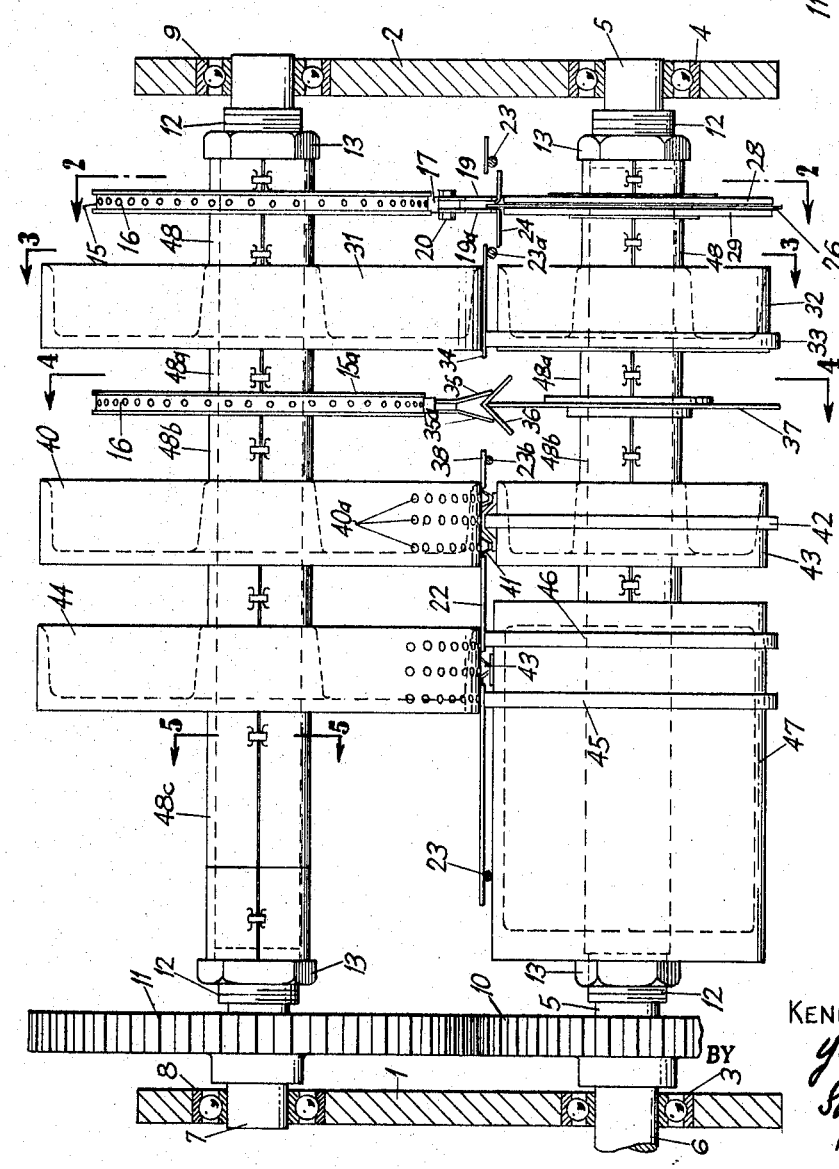
FIGURE 1 is a side elevational view which serves to illustrate a scrap stripping device having a plurality of stripping stations each of which comprises one of the alternative embodiments of the invention.

Referring first to FIGURE 1 of the drawings, I have therein illustrated a stripping device comprising spaced apart frame members 1 and 2 which define the opposite ends of the device. The frame members will be spaced apart in accordance with the maximum size of the sheets or webs to be handled. For example, it may be desired to handle sheets or webs having widths of 60 or 70 inches or even more, depending upon the size of the available paperboard stock. In any event, the frame members are provided with a pair of aligned lower bearings 3 and 4 which rotatably journal shaft 5 having a projecting end 6 which will be connected to a suitable driving means. For example, the shaft 6 may be connected to the drive means of a cutting press with which the stripping device is used, thereby timing the stripping mechanism with the cutting press.

Spaced upwardly from the shaft 5 is a second shaft 7 rotatably journaled at its opposite ends in bearings 8 and 9 supported by the frame members 1 and 2, respectively. The shaft 5 mounts a gear 10 which is in meshing engagement with a gear 11 mounted on the shaft 7, whereby the shaft 7 will be driven in timed relation to the movement of the shaft 5. The shafts 5 and 7 are also provided with threaded portions 12 which mount adjustment nuts 13 which, as will be explained more fully hereinafter, act in conjunction with a series of spacing members to align the stripping devices axially along the shafts.

Figure 2:
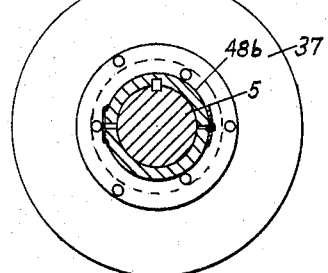
FIGURE 2 is a vertical sectional view taken along the line 2—2 of FIGURE 1.
Figure 2:
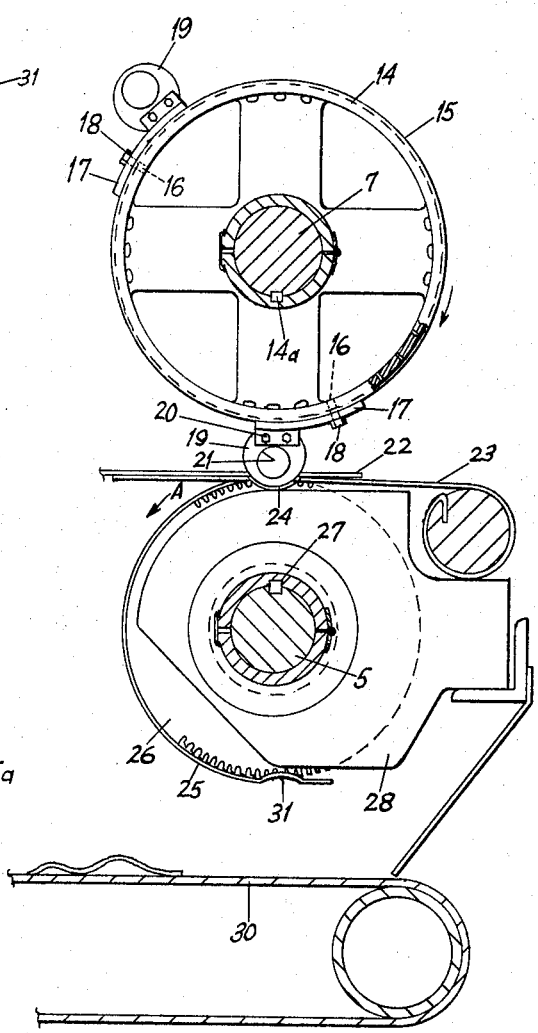

Referring now to FIGURE 2, the upper shaft 7 mounts a timing wheel 14 which is locked against rotation relative to the shaft by means of a key 14a. Preferably the wheel 14 will be formed from a material such as cast aluminum or ductile iron and will have a peripheral rim 15 as possibly best seen in FIGURE 1. This peripheral rim is provided with a series of spaced apart threaded openings 16 extending throughout the entire circumference of the wheel, and in an exemplary embodiment these openings may be spaced apart on the order of 10°. The openings thus provide a convenient means for mounting the lug carrying brackets 17 which are secured to the wheel by means of setscrews 18. The brackets 17 mount the spaced apart pairs of lugs 19, 19a which are preferably of generally circular configuration, although their uppermost surfaces may be truncated so as to facilitate their attachment to the brackets 17 by means of the bolts 20. If desired, the lugs may have their center portions removed, as at 21. As should be evident, a plurality of lugs may be spaced about the periphery of the wheel 14, and their location varied by the selection of the threaded openings with which the lug mounting brackets are associated.

A sheet or web of paperboard to be stripped is indicated at 22 and, as will be evidence, the paperboard travels in a straight line path beneath the wheel 14, being supported on a series of spaced apart guide rods 23, the positioning of the parts being such that the paperboard will freely pass beneath the wheel 14 and yet portions thereof will be contacted and deflected downwardly by the pairs of lugs 19, 19a as they are rotated into contact with the sheet or web. Essentially, the lugs make rocking contact with the paperboard and, of course, the timing of the parts will be such that the lugs will contact the areas of the blank to be removed, causing those areas to be pressed downwardly, as indicated at 24. This downward movement causes the contacted portion of the blank to be impaled upon the teeth 25 of a rotating disk 26 which underlies the path of travel of the blank, the disk being secured to the driven shaft 5 by means of the key 27. As best seen in FIGURE 1, the disk 26 is so aligned with respect to the overlying timing wheel 14 that its peripheral edge will pass between the spaced apart pairs of lugs 19, 19a, thereby assuring that the contacted portion of the blank will be impaled upon the teeth. In this connection, it will be noted that the guide rods 23 and 23a will be spaced apart by a distance such that they will lie just to the outside of the opposite edges of the portion of the blank being removed, so that the downward deflecting movement of the lugs will cause the scrap portion to be broken away from the remainder of the blank. As will be evident from FIGURE 2, as the disk 26 rotates in the direction of the arrow A, the scrap impaled upon the teeth of the disk will be carried downwardly by the disk where it will be removed upon contact with the undersurface of the side plates 28 and 29 which lie on opposite sides of the disk 26. The scrap is thus effectively removed from the teeth, whereupon it may fall onto a conveyor 30 for removal to a scrap box. The continuous series of teeth provide a sawing action in the event the scrap tends to wedge or hang between the side plates, thereby preventing jambing which might otherwise occur.

If the particular piece of scrap being stripped is relatively short, it need only be impaled upon the teeth of the rotating disk at one point, whereas it is of considerable length, it may be desirable to contact the scrap section at several places along its length, thereby impaling it upon the disk at a plurality of points. Thus the length of scrap 30 may be impaled on the rotating disk both at 24 and at 31.

Figure 3:
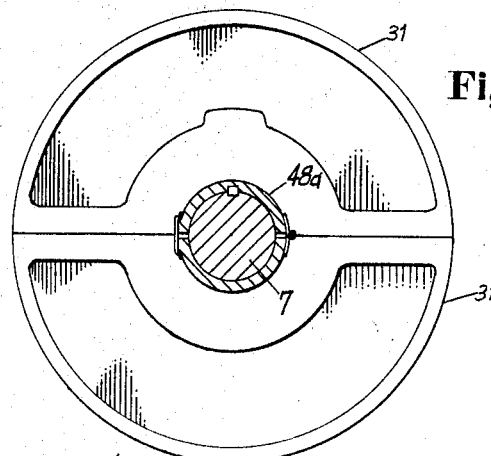
FIGURE 3 is a vertical sectional view taken along the line 3—3 of FIGURE 1.
Figure 4:
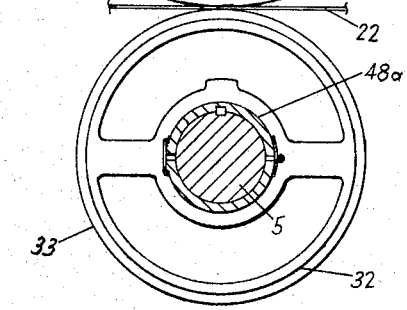
FIGURE 4 is a vertical sectional view taken along the line 4—4 of FIGURE 1.
Figure 4:
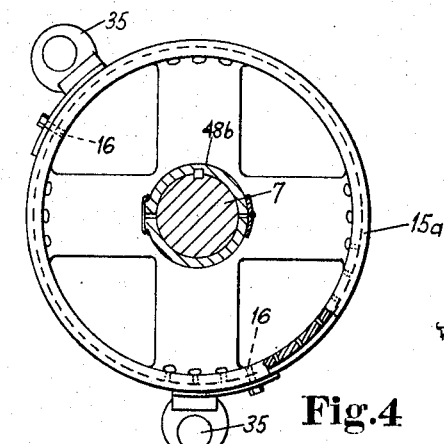

Referring now to FIGURE 3 of the drawings, I have therein illustrated an alternative form of timing wheel 31 which is a relatively wide wheel having a smooth surface adapted to directly contact the uppermost surface of the blank. Underlying the blank and coacting with the wheel 31 is a similar wheel 32 of somewhat smaller diameter, and this wheel is provided with an enlarged annular band 33 adapted to contact the undersurface of the blank in the manner best seen in FIGURE 1. The band 33 is preferably formed from a resilient material and may comprise rubber, cork or the like. Its function will be twofold: first to advance the blank through the stripping mechanism, and secondly to provide support for the blank immediately adjacent the edge of an area to be scrapped, such edge being indicated at 34. In this connection, the wheels 31 and 32 work in conjunction with the stripping mechanism illustrated in FIGURE 4 which comprises a timing wheel 15a mounted on the shaft 7, the timing wheel mounting one or more pairs of spaced apart lugs 35, 35a which in this instance are inclined outwardly in the manner illustrated in FIGURE 1. The lugs thus contact the scrap section 36 at spaced apart points and serve to break it downwardly over a rotating disk 37 which, in this instance, has a smooth peripheral surface. While the scrap is not impaled on the rotating disk 37, the rotary movement of the disk nonetheless serves to convey the scrap section downwardly away from the blank. As seen in FIGURE 1, the edge 38 at the opposite side of the scrap section 36 is supported from beneath by means of the guide rod 23b, although it should be evident that instead of the rod 23b a pair of timing wheels similar to the wheel 31 and 32 could be employed.

In another embodiment of the invention also illustrated in FIGURE 1, the timing wheel 40 has a smooth surface that is provided with aligned rows of threaded openings 40a which are adapted to selectively receive resilient tip members 41 which, upon rotation of the wheel, will contact portions of the blank to be stripped and deflect them downwardly causing the scrap portion to be broken over an annular band 42 mounted on the underlying wheel 43. Similarly, and with reference to the leftmost portion of FIGURE 1, a single tip member 43—or an aligned row of such tip members—mounted on a wheel 44 will cause a narrow section of scrap to be broken downwardly between a pair of annular bands 45 and 46 mounted on an underlying timing roll 47.

As should now be evident, in all of the modifications of the invention lug means act to contact the scrap areas of the blank and deflect them downwardly for removal. The deflecting action is unidirectional and is enforced by coacting means underlying the blanks which coact with the lug means to enforce the breaking away of the scrap and its subsequent removal.

Figure 5:
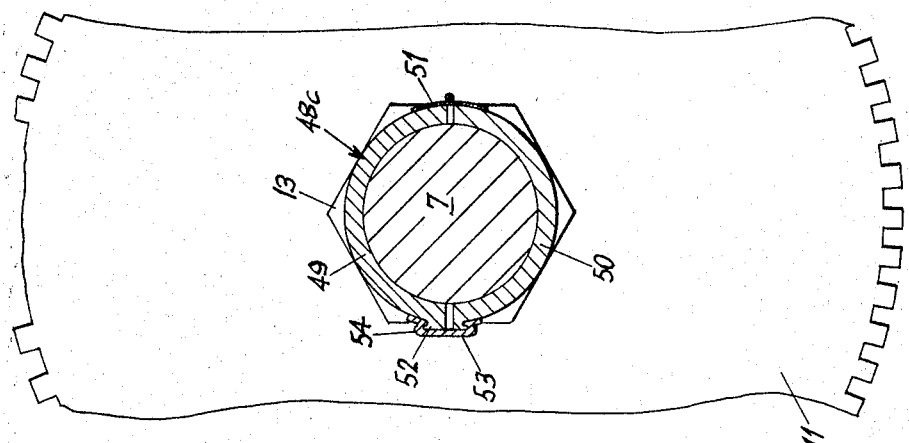
FIGURE 5 is a vertical sectional view taken along the line 5—5 of FIGURE 1.

As noted earlier herein, axial adjustment of the parts lengthwise along the shafts 5 and 7 is achieved by means of spacing members indicated generally by the reference numeral 48. These members may be of varying widths, as exemplified by the members 48a, 48b and 48c. As best seen in FIGURE 5, each of the spacing members comprises a pair of semi-cylindrical parts 49 and 50 secured together along one side edge by a hinge 51. At their opposite side edges each of the parts is provided with an abutment 52, 53, adapted to be engaged by a spring clip 54 which serves to secure the parts together in the closed position. It should be evident that upon the removal of the spring clip 54, the parts 49 and 50 may be opened and hence either engaged or removed from the shafts 5 and 7. It will be understood that once the desired spacing members have been associated with the shafts, the adjustment nuts 13 will be tightened, thereby securing the parts in the desired axial orientation. The use of such spacers materially simplifies the adjustment of the individual stripping units and yet, when the spacers are in place and the adjustment nuts 13 tightened, the entire assembly is effectively locked together, thereby preventing the units from individually slipping out of adjustment.

Modifications may be made in the invention without departing from its spirit and purpose. As already indicated, any given stripping device may comprise a plurality of like units, or several or all of the various modifications may be utilized in a single device depending upon the size and shape of the various areas to be scrapped. While a preference has been expressed for the collar-like spacing members, it will be evident that other arrangements may be employed, including the individual attachment of the timing wheel and rotating disks to the shaft, as by means of set screws and the like. It has also been found that the resilient tips need not be screw-threaded into the timing wheel, but rather may be adhesively secured to the peripheral surface of the wheel.

Having, however, described the invention in certain exemplary embodiments, what it is desired to secure and protect by Letters Patent is:

1. In a device for stripping scrap from a cut and scored paperboard blank, a frame, a pair of horizontally disposed shafts rotatably journaled to said frame and lying in vertically spaced apart relation, drive means operatively connected to said shafts for rotating them in timed relation, a timing wheel fixedly secured to the overlying shaft for rotation therewith, a wheel-like member in the form of a relatively thin circular disk fixedly secured to the underlying shaft for rotation therewith, said circular disk underlying said timing wheel, said timing wheel and said underlying circular disk defining a passline therebetween for the passage of a blank to be stripped, blank contacting means projecting radially outwardly from the periphery of said timing wheel, said blank contacting means comprising a plurality of spaced apart projections arranged to lie on opposite sides of the plane of said circular disk when said projections are at their point of closest approach to said circular disk, said projections acting, upon contact with an area of the blank to be removed, to deflect such area bodily downwardly into contact with said circular disk, with the area to be removed broken over the periphery of said circular disk.

2. The scrap stripping device claimed in claim 1 wherein the periphery of said circular disk is composed of a continuous series of outwardly projecting teeth.

3. The scrap stripping device claimed in claim 2 wherein said circular disk lies between a pair of side plates having edge portions thereof oriented to remove scrap impaled upon said teeth.

4. The scrap stripping device claimed in claim 1 wherein said timing wheel has a continuous series of radially disposed threaded openings extending about the periphery of said wheel in spaced apart relation, and wherein said blank contacting means comprises lug members adapted to be adjustably secured to said timing wheel by means of threaded elements selectively engageable in said threaded openings.

5. A method of stripping a scrap area from a cut and scored paperboard blank which comprises the steps of advancing said blank in a path of travel, contacting the scrap area to be removed from the blank from above and displacing said scrap area bodily downwardly out of the plane of the blank, including the step of causing the downwardly displaced scrap area to be broken over the periphery of a circular disk rotating beneath the path of travel of said blank.

6. A method of stripping a scrap area from a cut and scored paperboard blank which comprises the steps of advancing said blank in a path of travel, contacting the scrap area to be removed from the blank from above and displacing said scrap area downwardly out of the plane of the blank, including the step of causing the downwardly displaced scrap area to be impaled upon a series of spaced apart teeth moving in timed relation to the movement of the blank and lying beneath the path of travel of the blank.

7. The method claimed in claim 6 wherein said teeth comprise the periphery of a toothed disk, and wherein the scrap area to be removed is contacted from above at spaced apart points lying on opposite sides of the plane of said toothed disk, whereby upon downward displacement of said scrap area, it will be broken over the toothed periphery of said disk.

References Cited by the Examiner
UNITED STATES PATENTS

| | | |
|---|---|---|
| 2,035,857 | 3/1936 | Adsit. |
| 2,201,058 | 5/1940 | Staubli _____ 225—98 X |
| 2,615,376 | 10/1952 | Pelikan _____ 93—36 |
| 2,687,069 | 8/1954 | Burger et al. |
| 2,711,676 | 6/1955 | Richardson et al. _____ 93—36 |
| 2,753,936 | 7/1956 | MacChesney. |
| 2,778,286 | 1/1957 | Walker _____ 93—36 |
| 3,003,403 | 10/1961 | Goettsch _____ 93—58.2 |
| 3,117,499 | 1/1964 | Golding _____ 93—36 |

BERNARD STICKNEY, *Primary Examiner.*